United States Patent [19]

Matthews

[11] 4,368,057
[45] Jan. 11, 1983

[54] METHOD FOR REDUCING AMMONIA CONCENTRATION IN PRE-COMBUSTED FUEL GAS USING NITRIC OXIDE

[76] Inventor: Ronald D. Matthews, 1708 Westover, Austin, Tex. 78703

[21] Appl. No.: 196,397

[22] Filed: Oct. 14, 1980

[51] Int. Cl.$^3$ .............................. C10K 1/00; C10J 3/54
[52] U.S. Cl. ...................................... 48/197 R; 48/210; 423/235; 423/237; 423/351
[58] Field of Search ................... 423/235 D, 237, 351; 48/197 R, 210

[56] References Cited

U.S. PATENT DOCUMENTS 3,900,554 8/1975 Lyon ................................. 423/235

FOREIGN PATENT DOCUMENTS 2852143 6/1979 Fed. Rep. of Germany ........ 48/210

OTHER PUBLICATIONS

Folsom, et al., "Environmental Aspects of Low BTU Gas-Fired Catalytic Combustion," *Proceedings-Third EPA Workshop on Catalytic Combustion*, EPA Publication EPA-600/7-79-038, pp. 345-383, (1979).
Brown, et al., "Low NO$_x$ Combustion: The Effect of External Flue Gas Recirculation on the Emissions of Liquid Fuel Combustion", *Combustion Institute European Symposium*, Academic Press, New York, pp. 487-492, (1973).
Turner et al., "Influence of Combustion Modification and Fuel Nitrogen Content on Nitrogen Oxides Emissions from Fuel Oil Combustion", *AIChE Symposium Series*, 68, 126, pp. 55-65, (1972).
Gibbs et al., "The Influence of Air Staging on the NO Emissions from a Fluidized Bed Coal Combustor", *16th Symposium (International) on Combustion*, The Combustion Institute, Pittsburgh, pp. 461-474, (1976).
Exxon, "A Way to Lower NO$_X$ in Utility Boilers", *Environmental Science and Technology*, 11, 3, pp. 226-228, (1977).
Lyon, et al., "A Flow Reactor Study of the Ammonia-Oxygen Reaction", presented at the Fall Meeting of the Western States Section of the Combustion Institute, Laguna Beach, CA, (1978).
Shoffstal, et al., "Low-Btu Gas Combustion Research", *EPRI Report No. FP-848*, p. 2-1 (1978) (recite's gas composition of Winkler Air-Steam Coal Gas).

*Primary Examiner*—Peter F. Kratz
*Attorney, Agent, or Firm*—Arnold, White & Durkee

[57] ABSTRACT

Processes for converting NH$_3$ contaminants of gaseous fuel to N$_2$. The processes involve reacting gaseous fuel containing NH$_3$ with a sufficient amount of NO at a temperature and for a time sufficient to convert a portion of the NH$_3$ to N$_2$. The processes disclosed are especially useful in converting NH$_3$ contaminants in coal gas to N$_2$.

21 Claims, 5 Drawing Figures

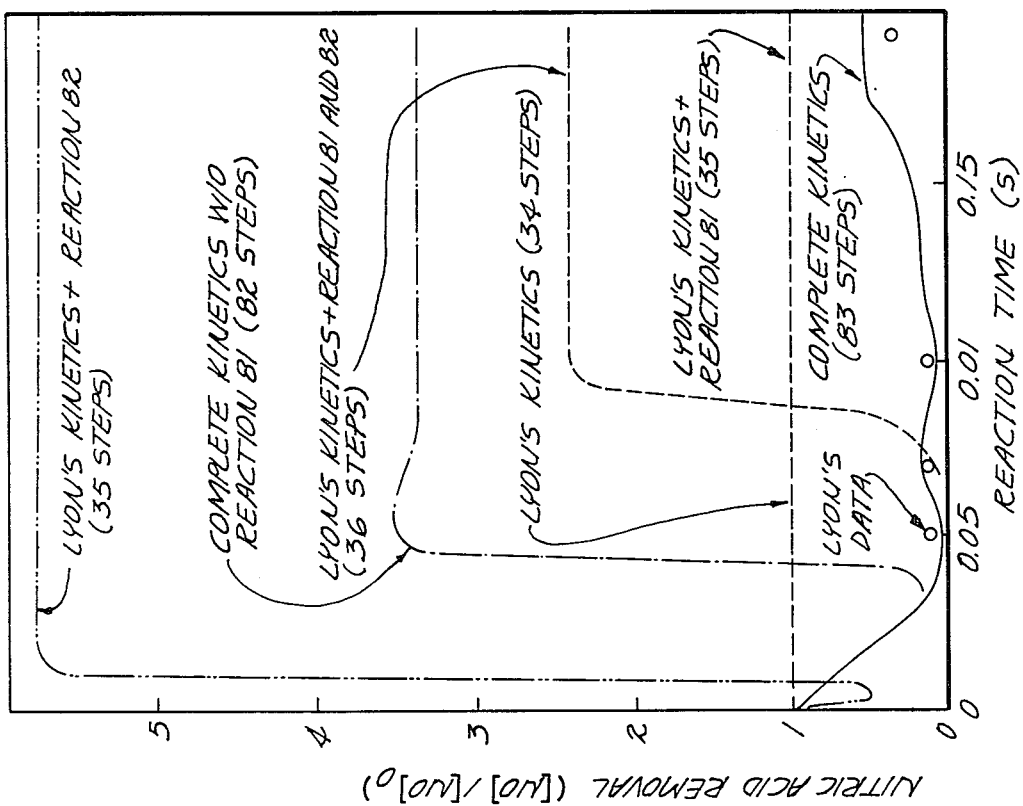
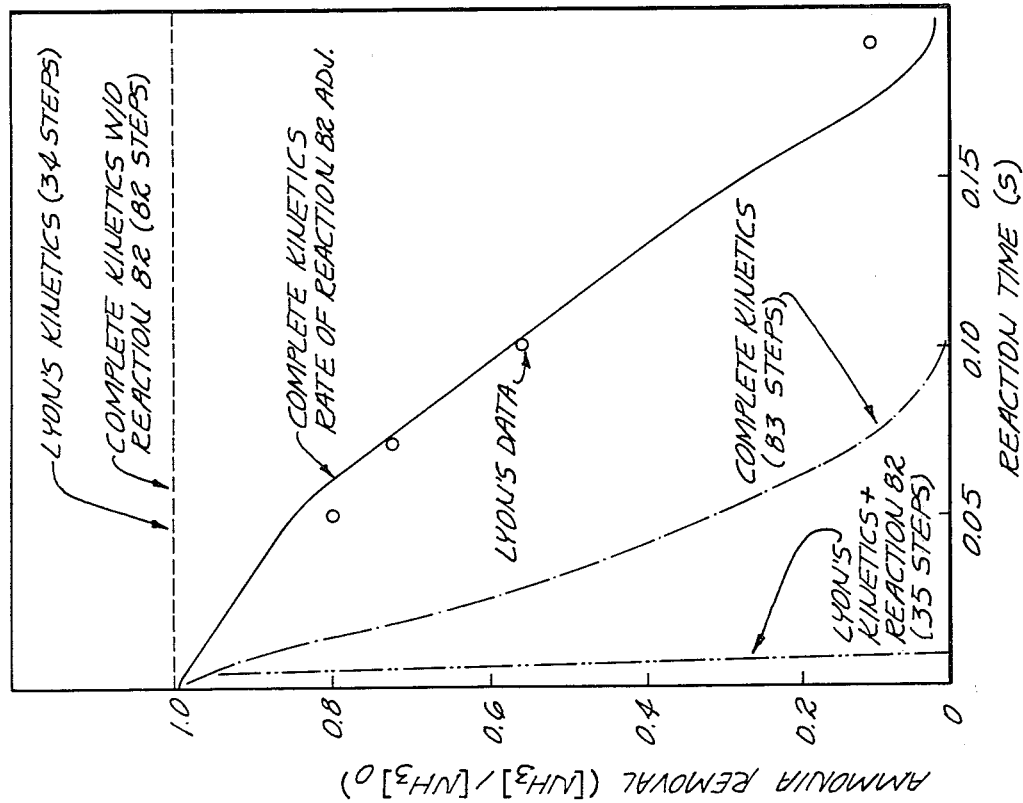
Fig. 2
Fig. 1

METHOD FOR REDUCING AMMONIA CONCENTRATION IN PRE-COMBUSTED FUEL GAS USING NITRIC OXIDE

BACKGROUND OF THE INVENTION

This invention relates to a method for reducing the concentration of $NH_3$ contaminants found in gaseous fuels. More particularly, this invention relates to the pre-combustion injection of NO into coal gas to convert $NH_3$ to $N_2$.

Because of the world-wide energy situation, the United States is returning to coal as a significant energy source. The direct utilization of coal poses many problems, most of which can be overcome by gasification. However, a significant problem remains with the production of air pollutants generated during the combustion of coal gas. These pollutants are generated from organically bound coal-sulfur and coal-nitrogen.

The fuel-sulfur is generally converted to $H_2S$ and the fuel-nitrogen is primarily converted to $NH_3$ with some HCN in the gasificaation process. Not only are these species relatively toxic and highly corrosive, but they are efficiently oxidized to $SO_x$ and $NO_x$ during the subsequent coal gas combustion process. $SO_x$ and $NO_x$ represent the various oxides of sulfur and nitrogen respectively. These particular combustion effluents have proved to be a major source of air pollution when discharged into the atmosphere. Therefore, a major problem associated with the combustion of coal gas is that federal $NO_x$ and $SO_x$ emission standards will be exceeded.

There have been considerable efforts in the art to find effective ways to remove these particular pollutants from coal gas or from the subsequent effluents of coal gas combustion. The advances have centered around, most particularly, fuel-sulfur derivatives. In particular, fuel-sulfur which is converted to hydrogen sulfide ($H_2S$) in coal gas is a chemical species which is much easier to remove than the post-combustion product $SO_2$. While much of the advances have been made with regard to fuel-sulfur, there remains a significant pollution problem with the formation of $NO_x$ from the gasification and subsequent combustion of coal-nitrogen. Although some of the sulfur related systems also remove some of the ammonia, these systems are not effective in selectively removing ammonia or the subsequent $NO_x$-produced pollutants. It has been calculated that $NO_x$ production from the residual $NH_3$ will exceed either present (215 g $NO_x/10^6$ kJ), or future federal standards (39 g $NO_x/10^6$ kJ) for $NO_x$ emission. It has been reported, for example, that low temperature $H_2S$ removal systems leave 100–500 ppm of $NH_3$ in coal gas and that this could lead to the production of about 43–258 g $NO_x/10^6$ kJ. See Folsom, et al., "Environmental Aspects of Low-Btu Gas-Fired Catalytic Combustion", Proceedings-Third EPA Workshop on Catalytic Combustion, EPA Publication EPA-600/7-79-038, pp. 345–383 (1979). Furthermore, high-temperature $H_2S$ removal systems do not affect the 400–4000 ppm of $NH_3$ present in the coal gas, and these levels could produce in the range of 215–2066 g $NO_x/10^6$ kJ. Furthermore, it should be noted that there are cost and efficiency penalties associated with the low-temperature $H_2S$ removal systems.

Methods for controlling $NO_x$ emissions for fuel nitrogen have been studied extensively. Most of the combustion modifications which are successful in treating thermal-$NO_x$ (oxides of nitrogen formed from the oxidation of atmospheric $N_2$) adversely affect fuel-$NO_x$ (oxides of nitrogen formed from the oxidation of $NH_3$ or other fuel-nitrogen species). Water injection, increased mixing intensity, and inert addition all increase fuel-$NO_x$. Furthermore, studies related to flue gas recirculation have been inconsistent. For example, Brown, et al., "Low $NO_x$ Combustion: the Effect of External Flue Gas Recirculation on the Emissions of Liquid Fuel Combustion", *Combustion Institute European Symposium*, Academic Press, New York, pp. 487–492, (1973), have reported an increase in $NO_x$ emission. In a study by Turner, et al., "Influence of Combustion Modification and Fuel Nitrogen Content on Nitrogen Oxides Emissions from Fuel Oil Combustion", *AIChE Symposium Series*, 68, 126, pp. 55–65, (1972), there was reported no effect on fuel-$NO_x$ subjected to flue gas recirculation. However, in contrast, Martin, et al., "An Investigation of the Conversion of Various Fuel Nitrogen Compounds to $NO_x$ in Oil Combustion", A.I.Ch.E. National Meeting, Atlantic City, (August, 1971), have reported a decrease in fuel-$NO_x$ related to flue gas recirculation. Only staged combustion as reported by Gibbs, et al., "The Influence of Air Staging on the NO Emissions from a Fluidized Bed Coal Combustor," 16th *Symposium (International) on Combustion*, the Combustion Institute, Pittsburgh, pp. 461–474, (1976) and "Catalytic Combustion" as reported by Folsom, et al., supra, have been shown to decrease both thermal-$NO_x$ and fuel-$NO_x$.

The inability of most combustion modifications to control both thermal-$NO_x$ and fuel-$NO_x$ is one reason for interest in stack gas treatment techniques. The technique of most relevance to the present invention involves ammonia injection into the flue gas. For example, Lyon, U.S. Pat. No. 3,900,554, Aug. 19, 1975, discloses a post-combustion method wherein $NH_3$ reacts selectively with NO to form primarily $N_2$. However, in practice, trace amounts of $N_2O$, $NH_3$, and HCN may be emitted. This concept of NO reduction with $NH_3$ has been successfully applied to an oil-fired boiler and a gas-fired furnace, yielding up to a 70% decrease in $NO_x$ emission. See, for example, Exxon, "A Way to Lower $NO_x$ in Utility Boilers", *Environmental Science and Technology*, 11, 3, pp. 226–228 (1977).

The present invention provides a method for converting the $NH_3$ to $N_2$ before combustion thereby precluding formation of $NO_x$ in subsequent combustion operations. This process has several advantages over other fuel-$NO_x$ control techniques. Most importantly, $N_2$ is oxidized at less than 1% efficiency to $NO_x$ during combustion. Therefore, the present inventive process anticipates lowering post-combustive $NO_x$ by up to two orders of magnitude relative to untreated systems.

The present invention applies a $NH_3$—NO chemical reaction to the pre-combustion control of fuel-nitrogen in coal gas. This invention contemplates that NO injected into a stream or quantity of coal gas converts the $NH_3$ contaminants to $N_2$. This process is beneficial from several perspectives.

First, the end product of the process, $N_2$, is nontoxic and noncorrosive. This characteristic is especially important if coal gas is to be substituted for natural gas for domestic use, but it is also attractive for a coal gasifier-electric power plant combination.

Second, and most importantly, $N_2$ is more difficult to oxidize than is $NH_3$. At combustion temperatures, $N_2$ is converted to $NO_x$ with an efficiency of conversion of less than 1% compared to $NH_3$ which can be oxidized to $NO_x$ with an efficiency of up to 100%.

A further advantage of this process is that the conversion of $NH_3$ to $N_2$ may take place as the coal gas exits from the gasifier. The temperature of the coal gas as it exits from the coal gasifier is sufficient to drive the conversion reaction without additional heat induction.

A fourth advantage of this process is that it requires no modifications to the combustion system; a situation which often requires high cost equipment fabrication.

SUMMARY OF THE INVENTION

This invention relates to the selective conversion of $NH_3$ to $N_2$ by contacting pre-combusted gaseous fuel with NO at elevated temperatures.

This invention contemplates the provision of a stream or quantity of gaseous fuel, such as coal gas, containing nitrogenous contaminants, primarily in the form of $NH_3$. The gaseous fuel is contacted with NO at elevated temperatures for a time sufficient to effect a conversion of $NH_3$ to $N_2$. The efficiency of the reaction is a function of reaction temperature, reactant concentrations and reaction time.

Embodiments of the invention are discussed wherein the various parameters of time, temperature, and NO reactant concentration are assessed by computer simulation of the $NH_3$—NO kinetic chemistry.

BRIEF DESCRIPTION OF THE DRAWINGS

A more complete appreciation of the invention may be had by reference to the accompanying drawings, wherein:

FIG. 1 depicts the significance of Reaction 82 in modeling $NH_3$ removal in a system containing 900 ppm $NH_3$, 98 ppm NO, and 2% $O_2$ in a helium balance at 1310° K. and 1.2 atm.

FIG. 2 depicts the significance of Reaction 81 in modeling NO removal from a system containing 900 ppm $NH_3$, 98 ppm NO, and 2% $O_2$ in a helium balance at 1310° K. and 1.2 atm.

DETAILED DESCRIPTION OF THE ILLUSTRATIVE EMBODIMENTS

Figure 3:
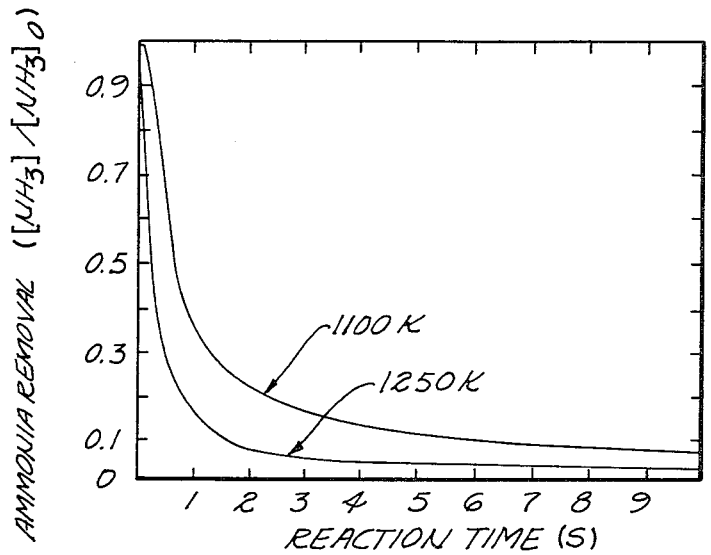
FIG. 3 depicts the effect of reaction time on ammonia removal from coal gas for the temperature range of the Winkler Air-Steam Gasification Process.

The following discussion is in terms of the preferred illustrative embodiments of this invention, which represent the best mode known to the inventor at the time of this application.

In accordance with the illustrative embodiments of this invention, $NH_3$-NO chemistry was theoretically applied to coal gas production to effect subsequent conversion of $NH_3$ to $N_2$. First, a kinetic mechanism was established and verified through comparison with experimental data. The chemical mechanism was then applied to a pre-combustion coal gas fuel-nitrogen control problem simulating a working model.

A. Chemical Kinetic Mechanism

A list of chemical reactions embodying the anticipated species present in a $NH_3$-NO conversion system for coal gas was compiled. This list is presented in Table I, wherein the associated pre-exponential factor (z) and activation energy (E) which comprise the rate coefficients are also tabulated. Rate coefficients of second order reactions are given in cc/mole-sec and third order reactions are recorded in $cm^6/mole^2$-sec. Any reactions for which the temperature dependence of the pre-exponential factor, (z), is known have this dependence included in z.

Although several different mechanisms comprising varying reaction sequences, additional reactions or fewer reactions may be envisioned, Table I encompasses one mechanism which is effective in substantially modeling the experimental data. The listed mechanism should not be construed as representing the one correct mechanism concerning the conversion reaction $NH_3$ to $N_2$.

TABLE 1

Kinetic Mechanism for $NH_3$—NO Reactions in Coal Gas

| | Reactants | Products | z | E | Source* |
|---|---|---|---|---|---|
| 1 | $NH_2 + NO$ | $N_2 + H_2O$ | $1.20 \times 10^{12}$ | $-1.20 \times 10^3$ | Lyon, et al. (1978) |
| 2 | $NH_2 + NO$ | $N_2 + H + OH$ | $1.40 \times 10^{11}$ | $-1.20 \times 10^3$ | Lyon, et al. (1978) |
| 3 | $NH_2 + OH$ | $HNO + H_2$ | $2.00 \times 10^{12}$ | 0.0 | Lyon, et al. (1978) |
| 4 | $OH + NH_3$ | $H_2O + NH_2$ | $1.40 \times 10^{12}$ | $1.60 \times 10^3$ | Lyon, et al. (1978) |
| 5 | $O + NH_3$ | $OH + NH_2$ | $1.50 \times 10^{12}$ | $6.00 \times 10^3$ | Lyon, et al. (1978) |
| 6 | $NH_3 + M$ | $NH_2 + H + M$ | $4.00 \times 10^{15}$ | $8.30 \times 10^4$ | Lyon, et al. (1978) |
| 7 | $NH_2 + O$ | $HNO + H$ | $2.50 \times 10^{13}$ | $1.50 \times 10^3$ | Lyon, et al. (1978) |
| 8 | $HNO + M$ | $H + NO + M$ | $3.00 \times 10^{16}$ | $4.87 \times 10^4$ | Lyon, et al. (1978) |
| 9 | $O_2 + H$ | $O + OH$ | $2.24 \times 10^{14}$ | $1.68 \times 10^4$ | Baulch, et al. (1972,73,76) |
| 10 | $H_2 + M$ | $H + H + M$ | $3.10 \times 10^{15}$ | $1.10 \times 10^5$ | Baulch, et al. (1972,73,76) |
| 11 | $H + H + M$ | $H_2 + M$ | $6.50 \times 10^{14}$ | 0.0 | Baulch, et al. (1972,73,76) |
| 12 | $OH + O$ | $O_2 + H$ | $1.30 \times 10^{13}$ | 0.0 | Baulch, et al. (1972,73,76) |
| 13 | $HO_2 + M$ | $O_2 + H + M$ | $2.40 \times 10^{15}$ | $4.59 \times 10^4$ | Baulch, et al. (1972,73,76) |
| 14 | $O_2 + H + M$ | $HO_2 + M$ | $1.59 \times 10^{15}$ | $-1.00 \times 10^3$ | Baulch, et al. (1972,73,76) |
| 15 | $H_2 + O$ | $OH + H$ | $1.74 \times 10^{13}$ | $9.45 \times 10^3$ | Baulch, et al. (1972,73,76) |
| 16 | $H + OH$ | $H_2 + O$ | $7.33 \times 10^{12}$ | $7.30 \times 10^3$ | Baulch, et al. (1972,73,76) |
| 17 | $H_2O + H$ | $H_2 + OH$ | $8.41 \times 10^{13}$ | $2.01 \times 10^4$ | Baulch, et al. (1972,73,76) |
| 18 | $H_2 + OH$ | $H_2O + H$ | $2.19 \times 10^{13}$ | $5.15 \times 10^3$ | Baulch, et al. (1972,73,76) |
| 19 | $H_2O + O$ | $OH + OH$ | $5.75 \times 10^{13}$ | $1.80 \times 10^4$ | Baulch, et al. (1972,73,76) |
| 20 | $OH + OH$ | $H_2O + O$ | $5.75 \times 10^{12}$ | $7.80 \times 10^2$ | Baulch, et al. (1972,73,76) |
| 21 | $H_2O + M$ | $H + OH + M$ | $1.00 \times 10^{17}$ | $1.17 \times 10^5$ | Baulch, et al. (1972,73,76) |
| 22 | $H_2O_2 + H$ | $H_2 + HO_2$ | $2.34 \times 10^{13}$ | $9.20 \times 10^3$ | Baulch, et al. (1972,73,76) |
| 23 | $H_2 + HO_2$ | $H_2O_2 + H$ | $9.60 \times 10^{12}$ | $2.40 \times 10^4$ | Baulch, et al. (1972,73,76) |
| 24 | $H_2O_2 + OH$ | $H_2O + HO_2$ | $1.00 \times 10^{13}$ | $1.80 \times 10^3$ | Baulch, et al. (1972,72,76) |
| 25 | $H_2O + HO_2$ | $H_2O_2 + OH$ | $2.80 \times 10^{13}$ | $3.27 \times 10^4$ | Baulch, et al. (1972,73,76) |

TABLE 1-continued
Kinetic Mechanism for NH₃—NO Reactions in Coal Gas

| | Reactants | Products | z | E | Source* |
|---|---|---|---|---|---|
| 26 | $H_2O_2 + M$ | $OH + H + M$ | $1.20 \times 10^{17}$ | $4.55 \times 10^4$ | Baulch, et al. (1972,73,76) |
| 27 | $OH + OH + M$ | $H_2O_2 + M$ | $8.40 \times 10^{14}$ | $-5.30 \times 10^3$ | Baulch, et al. (1972,73,76) |
| 28 | $H_2O_2 + H$ | $H_2O + OH$ | $3.18 \times 10^{14}$ | $9.00 \times 10^3$ | Baulch, et al. (1972,73,76) |
| 29 | $H_2O + OH$ | $H_2O_2 + H$ | $5.60 \times 10^{13}$ | $7.79 \times 10^4$ | Baulch, et al. (1972,73,76) |
| 30 | $OH + H + H_2O$ | $H_2O + H_2O$ | $1.17 \times 10^{17}$ | 0.0 | Baulch, et al. (1972,73,76) |
| 31 | $OH + H + He$ | $H_2O + He$ | $7.02 \times 10^{15}$ | 0.0 | Baulch, et al. (1972,73,76) |
| 32 | $OH + H + H_2$ | $H_2O + H_2$ | $2.92 \times 10^{16}$ | 0.0 | Baulch, et al. (1972,73,76) |
| 33 | $OH + H + O_2$ | $H_2O + O_2$ | $2.92 \times 10^{16}$ | 0.0 | Baulch, et al. (1972,73,76) |
| 34 | $OH + H + N_2$ | $H_2O + N_2$ | $2.34 \times 10^{16}$ | 0.0 | Baulch, et al. (1972,73,76) |
| 35 | $N_2 + M$ | $N + N + M$ | $1.50 \times 10^{16}$ | $2.25 \times 10^5$ | Baulch, et al. (1972,73,76) |
| 36 | $N + N + M$ | $N_2 + M$ | $1.50 \times 10^{14}$ | 0.0 | Baulch, et al. (1972,73,76) |
| 37 | $O_2 + M$ | $O + O + M$ | $3.56 \times 10^{15}$ | $1.18 \times 10^5$ | Baulch, et al. (1972,73,76) |
| 38 | $O + O + M$ | $O_2 + M$ | $2.00 \times 10^{14}$ | 0.0 | Baulch, et al. (1972,73,76) |
| 39 | $N_2O + M$ | $N_2 + O + M$ | $1.00 \times 10^{12}$ | $3.22 \times 10^4$ | Baulch, et al. (1972,73,76) |
| 40 | $N_2 + O + M$ | $N_2O + M$ | $1.82 \times 10^{13}$ | $2.14 \times 10^4$ | Baulch, et al. (1972,73,76) |
| 41 | $N_2O + O$ | $NO + NO$ | $1.00 \times 10^{14}$ | $2.70 \times 10^4$ | Baulch, et al. (1972,73,76) |
| 42 | $NO + NO$ | $N_2O + O$ | $2.40 \times 10^{13}$ | $6.60 \times 10^4$ | Baulch, et al. (1972,73,76) |
| 43 | $NO_2 + M$ | $NO + O + M$ | $1.10 \times 10^{16}$ | $6.50 \times 10^4$ | Baulch, et al. (1972,73,76) |
| 44 | $NO + O + M$ | $NO_2 + M$ | $1.05 \times 10^{15}$ | $-1.87 \times 10^3$ | Baulch, et al. (1972,73,76) |
| 45 | $NO_2 + O$ | $NO + O_2$ | $1.00 \times 10^{13}$ | $6.00 \times 10^2$ | Baulch, et al. (1972,73,76) |
| 46 | $NO + O_2$ | $NO_2 + O$ | $1.00 \times 10^{12}$ | $4.50 \times 10^4$ | Baulch, et al. (1972,73,76) |
| 47 | $NO + N$ | $N_2 + O$ | $3.10 \times 10^{13}$ | $3.34 \times 10^2$ | Baulch, et al. (1972,73,76) |
| 48 | $N_2 + O$ | $NO + N$ | $1.36 \times 10^{14}$ | $7.54 \times 10^4$ | Baulch, et al. (1972,73,76) |
| 49 | $NO + O$ | $O_2 + N$ | $2.25 \times 10^{12}$ | $3.86 \times 10^4$ | Baulch, et al. (1972,73,76) |
| 50 | $O_2 + N$ | $NO + O$ | $9.00 \times 10^{12}$ | $6.25 \times 10^3$ | Baulch, et al. (1972,73,76) |
| 51 | $NO + M$ | $N + O + M$ | $5.40 \times 10^{15}$ | $1.49 \times 10^5$ | Baulch, et al. (1972,73,76) |
| 52 | $N + O + M$ | $NO + M$ | $1.65 \times 10^{15}$ | 0.0 | Baulch, et al. (1972,73,76) |
| 53 | $O + N_2O$ | $N_2 + O_2$ | $8.50 \times 10^{13}$ | $2.80 \times 10^4$ | Baulch, et al. (1972,73,76) |
| 54 | $NO + N_2O$ | $N_2 + NO_2$ | $2.50 \times 10^{13}$ | $5.00 \times 10^4$ | Baulch, et al. (1972,73,76) |
| 55 | $NO_2 + N$ | $NO + NO$ | $1.00 \times 10^{13}$ | 0.0 | Baulch, et al. (1972,73,76) |
| 56 | $NO + NO$ | $NO_2 + N$ | $1.00 \times 10^{10}$ | $8.80 \times 10^4$ | Baulch, et al. (1972,73,76) |
| 57 | $NO_2 + NO_2$ | $NO + NO + O_2$ | $4.00 \times 10^{12}$ | $2.69 \times 10^4$ | Baulch, et al. (1972,73,76) |
| 58 | $NO + NO + O_2$ | $NO_2 + NO_2$ | $2.40 \times 10^9$ | $1.05 \times 10^3$ | Baulch, et al. (1972,73,76) |
| 59 | $H + HO_2$ | $OH + OH$ | $2.40 \times 10^{14}$ | $1.89 \times 10^3$ | Jenson and Jones (1978) |
| 60 | $H + HO_2$ | $H_2 + O_2$ | $2.40 \times 10^{13}$ | $6.95 \times 10^2$ | Jenson and Jones (1978) |
| 61 | $H_2 + HO_2$ | $H_2O + OH$ | $6.00 \times 10^{11}$ | $1.87 \times 10^4$ | Jenson and Jones (1978) |
| 62 | $O + HO_2$ | $OH + O_2$ | $4.80 \times 10^{13}$ | $9.93 \times 10^2$ | Jenson and Jones (1978) |
| 63 | $OH + HO_2$ | $H_2O + O_2$ | $3.00 \times 10^{13}$ | 0.0 | Jenson and Jones (1978) |
| 64 | $N + H_2$ | $NH + H$ | $1.00 \times 10^{13}$ | $2.10 \times 10^4$ | Sorenson (1979) |
| 65 | $H + NH$ | $H_2 + N$ | $1.00 \times 10^{10}$ | 0.0 | Sorenson (1979) |
| 66 | $N + NH$ | $N_2 + H$ | $1.00 \times 10^{13}$ | 0.0 | Sorenson (1979) |
| 67 | $N + H + M$ | $NH + M$ | $1.00 \times 10^{15}$ | 0.0 | Sorenson (1979) |
| 68 | $NH + O$ | $NO + H$ | $5.00 \times 10^{12}$ | $7.00 \times 10^3$ | Sorenson (1979) |
| 69 | $NH + OH$ | $H_2O + N$ | $1.00 \times 10^{14}$ | $5.00 \times 10^3$ | Sorenson (1979) |
| 70 | $H + NO + M$ | $HNO + M$ | $1.00 \times 10^{15}$ | 0.0 | Sorenson (1979) |
| 71 | $HNO + H$ | $H_2 + NO$ | $6.04 \times 10^{13}$ | $1.00 \times 10^4$ | Sorenson (1979) |
| 72 | $HNO + O$ | $OH + NO$ | $5.00 \times 10^{12}$ | $7.00 \times 10^3$ | Sorenson (1979) |
| 73 | $HNO + OH$ | $H_2O + NO$ | $1.68 \times 10^{13}$ | $5.00 \times 10^3$ | Sorenson (1979) |
| 74 | $NO + NO$ | $N_2 + O_2$ | $1.35 \times 10^{14}$ | $7.56 \times 10^4$ | Kondratiev (1972) |
| 75 | $NO + H_2$ | $HNO + H$ | $3.09 \times 10^{14}$ | $5.79 \times 10^4$ | Kondratiev (1972) |
| 76 | $OH + NH_2$ | $H_2O + NH$ | $4.94 \times 10^{12}$ | $1.30 \times 10^3$ | Kondratiev (1972) |
| 77 | $H + NH_2$ | $NH + H_2$ | $8.00 \times 10^{10}$ | $5.60 \times 10^3$ | Branch and Sawyer (1971) |
| 78 | $H + NH_3$ | $NH_2 + H_2$ | $1.00 \times 10^{12}$ | $6.23 \times 10^3$ | Branch and Sawyer (1971) |
| 79 | $N + OH$ | $NO + H$ | $4.20 \times 10^{13}$ | 0.0 | Sorenson (1979) |
| 80 | $NO + H$ | $N + OH$ | $5.00 \times 10^{13}$ | $4.80 \times 10^4$ | Sorenson (1979) |
| 81 | $NH_2 + HNO$ | $NH_3 + NO$ | $2.56 \times 10^{13}$ | 0.0 | Kondratiev (1972) |
| 82 | $NH_3 + NH_3$ | $NH_2 + NH_2 + H_2$ | $4.97 \times 10^{12}$ | $2.39 \times 10^4$ | Kondratiev (1972) |
| 83 | $NH_2 + NH_2$ | $NH_3 + NH$ | $3.98 \times 10^{12}$ | $5.56 \times 10^3$ | Branch and Sawyer (1971) |
| 84 | $CO + HO_2$ | $CO_2 + OH$ | $1.50 \times 10^{14}$ | $2.36 \times 10^4$ | Jenson and Jones (1978) |
| 85 | $HCO + O$ | $CO + OH$ | $1.80 \times 10^{13}$ | $4.96 \times 10^3$ | Jenson and Jones (1978) |
| 86 | $HCO + H$ | $CO + H_2$ | $1.20 \times 10^{14}$ | $4.96 \times 10^3$ | Jenson and Jones (1978) |
| 87 | $CH_4 + H$ | $CH_3 + H_2$ | $4.20 \times 10^{14}$ | $1.49 \times 10^4$ | Jenson and Jones (1978) |
| 88 | $CH_4 + O$ | $CH_3 + OH$ | $3.00 \times 10^{13}$ | $8.94 \times 10^3$ | Jenson and Jones (1978) |
| 89 | $CH_4 + OH$ | $CH_3 + H_2O$ | $3.00 \times 10^{13}$ | $4.96 \times 10^3$ | Jenson and Jones (1978) |
| 90 | $CO + O + M$ | $CO_2 + M$ | $2.52 \times 10^{15}$ | $4.37 \times 10^3$ | Jenson and Jones (1978) |
| 91 | $CO + O_2$ | $CO_2 + O$ | $2.52 \times 10^{12}$ | $4.77 \times 10^4$ | Jenson and Jones (1978) |
| 92 | $H + CO + M$ | $HCO + M$ | $7.20 \times 10^{14}$ | $1.69 \times 10^3$ | Jenson and Jones (1978) |
| 93 | $CO + OH$ | $CO_2 + H$ | $7.10 \times 10^{12}$ | $7.70 \times 10^3$ | Sorenson (1970) |
| 94 | $CO_2 + H$ | $CO + OH$ | $4.70 \times 10^{14}$ | $2.73 \times 10^4$ | Sorenson (1970) |
| 95 | $HCO + OH$ | $H_2O + CO$ | $6.00 \times 10^{13}$ | 0.0 | Sorenson (1979) |
| 96 | $HCO + M$ | $H + CO + M$ | $7.00 \times 10^{13}$ | $1.50 \times 10^4$ | Sorenson (1970) |
| 97 | $OH + H + CO_2$ | $H_2O + CO_2$ | $5.26 \times 10^{16}$ | 0.0 | Baulch, et al. (1972,73,76) |
| 98 | $NO_2 + CO$ | $NO + CO_2$ | $1.91 \times 10^{12}$ | $2.93 \times 10^4$ | Kondratiev (1972) |

*Sources or compilations of the kinetic schemes—not the original references for the rate coefficients.

The listing of possible chemical reactions which was formulated with the intent of being as inclusive as possible comprises 98 reactions involving 23 species. The first 34 reactions are the chemical mechanism modeling an $NH_3/NO/O_2$ system formulated by Lyon, et al., "A Flow Reactor Study of the Ammonia-Oxygen Reaction," presented at the Fall meeting of the Western States Section of the Combustion Institute, Laguna Beach, CA (1978). Reactions 35–58 are additional nitrogen-oxygen reactions compiled by Baulch, et al., *Evaluated Kinetic Data for High Temperature Reactions*, Vol. 1 (1972); Vol. 2 (1973); Vol. 3 (1976) Butterworths, London. Reactions 59–63 are other hydrogen-oxygen reactions obtained from the compilation by Jenson and Jones, "Reaction Rate Coefficients for Flame Calculations," *Combustion and Flame*, 32: 1–34 (1978). Reactions 64–73 are reactions in the hydrogen-nitrogen-oxygen system presented by Sorenson, S. C. in a private communication (1979). Further, reactions 74–83 are the remaining nitrogen-hydrogen-oxygen reactions obtained from the various sources: Branch and Sawyer, "Review and Evaluation of Rate Date for Gas Phase Reaction of the N—H System," Department of Mechanical Engineering, University of California at Berkeley, Report No. TS-71-1 (June, 1971); Kondratiev, *Rate Constants of Gas Phase Reactions*, Office of Standard Reference Data, National Bureau of Standards, U.S. Department of Commerce, Washington, D.C. (January, 1972); and Sorenson, S. C., private communication (1979). Moreover, a methane oxidation scheme is provided by reactions 84–98 compiled from Jenson and Jones, supra; Kondratiev, supra; and Sorenson, S. C., "Ethane Kinetics in Spark-Ignition Engine Exhaust Gases," *Thirteen Symposium (International) on Combustion*, the Combustion Institute, Pittsburgh, pp. 451–459 (1970).

In accordance with the illustrative embodiment of this invention, a chemical kinetic scheme was developed to fit experimental data presented by Lyon, et al., "A Flow Reactor Study of the Ammonia-Oxygen Reaction," supra, hereby incorporated by reference. The plug flow reactor study of Lyon and coworkers was designed to investigate the reduction of nitric oxide by ammonia in the presence of oxygen. The temperature along the reactor was kept constant, at 1310° k., and an inert environment was provided by the use of helium as a carrier gas.

Accordingly, the kinetic mechanisms outlined in the first 83 reactions of Table I were tested against Lyon's experimental data. The last fifteen reactions were deleted during this initial mechanistic workup because a carbon-free system was being modeled.

The importance of several groups of these reactions was determined in an iterative comparison of theory and data. A portion of the results are shown in FIG. 1. The experimental data show that ammonia concentration decays with time for an initial mixture of 900 ppm $NH_3$, 98 ppm NO, and 2% $O_2$ held at 1310° K. and 1.2 atm. The Lyon's kinetic mechanism, which had N—H—O reactions and H—O reactions was unsuccessful to predict any change in ammonia level. Further, the extended mechanism which included 82 reactions failed to predict any change if a particular reaction (Reaction 82) was omitted. Addition of this single reaction (Reaction 82) to the Lyon's 34 step mechanism dramatically changes the prediction, from one of no effect to one of extremely rapid ammonia decay. Inserting the additional steps not considered by Lyon, a set of 83 reactions, slows the reaction further.

Moreover, the 83 reaction scheme can be further adjusted to yield a reasonably close fit to the experimental data. In this instance the pre-exponential factor of Reaction 82 was adjusted. The original pre-exponential factor was $4.97 \times 10^{12}$ and the adjusted factor was $1.15 \times 10^{12}$. Adjustment of this rate factor is justified because the original rate for the reaction, $NH_3 + NH_3 \rightarrow 2NH_2 + H_2$, was determined in a shock tube investigation for temperatures in the range of 2900°–9600° K. It is significant that the adjusted factor is lower than the original, clearly in the correct direction since the present work is at lower temperatures than the original study. Also, assuming a temperature dependence of the order of $T^{\frac{1}{2}}$, the adjusted pre-exponential factor is of the correct order of magnitude. The fact that this chain initiating step is a global reaction is not significant from the perspective of the purposes of the inventive model since details of the microchemistry were not of interest. It was necessary and sufficient to develop a kinetic model, either global or detailed, to investigate the feasibility of the inventive process.

Further in accordance with the kinetic scheme supporting this inventive process, investigation was made into the disappearance of NO, represented by FIG. 2. Lyon and coworkers experimentally determined that the NO concentration decreased with time. Their mechanism, however, failed to show any effect on the NO level. Furthermore, addition of Reaction 82 to Lyon's mechanism predicts an increase in NO, a result contrary to the intent of the present inventive process. This indicates that additional reactions are important for a proper model illustrating a complete kinetic mechanism which simulates the observed decrease in NO concentration.

Surprisingly, the critical reaction which is necessary to model a decrease in NO is the global chain terminating NO producing reaction:

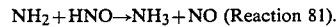

$NH_2 + HNO \rightarrow NH_3 + NO$ (Reaction 81).

Further, because Lyon's mechanism plus Reactions 81 and 82 is insufficient to properly predict the NO removal, it is concluded that at least some of the additional reactions of the complete 83 step scheme are also important.

It was not deemed necessary to determine whether any of the reactions in the 83 step scheme were not necessary to model Lyon's experimental results. Although it is probable that some of these reactions are not significant for Lyon's system, they might be important for the coal gas modeling.

B. Application of the $NH_3$—NO Kinetic Mechanism to Coal Gas

For the purposes of this investigation, the Winkler fluidized bed, low-Btu gasifier, manufactured by Davey McKee Corporation, was chosen as a representative coal gasification process. This system is operated at temperatures between 1100° K. and 1250° K. at atmospheric pressure. The typical gas composition for a Winkler Air-Steam gasifier is shown in Table II. An ammonia concentration of 4000 ppm was assumed and this level was inserted by decreasing the $N_2$ level by 0.4%.

TABLE II

Composition of Winkler Air-Steam Coal Gas
(Shoffstall and Waibel, EPRI Report No. FP-848, 1978)

| Species | % by Volume |
|---|---|
| CO | 21.1 |
| $H_2$ | 13.0 |
| $CO_2$ | 6.9 |
| $CH_4$ | 0.6 |
| $N_2$ | 56.5 |

TABLE II-continued

Composition of Winkler Air-Steam Coal Gas
(Shoffstall and Waibel, EPRI Report No. FP-848, 1978)

| Species | % by Volume |
|---------|-------------|
| $H_2O$  | 1.9         |

The simulation for the coal gas conversion of $NH_3$ to $N_2$ involved the kinetic scheme outlined in the previous section, A, and included Reactions 84–98. These additional reaction steps were included to account for the carbon species present in coal gas. Furthermore, Reaction 31 was deleted in the coal gas kinetic study because the products of gasification contain negligible amounts of helium.

In the practice of this invention to effect an efficient conversion of $NH_3$ contaminants to $N_2$ in gaseous fuel, specifically coal gas, it is important that the NO be contacted with the gaseous fuel in such a manner that the reaction desirably occurs within the temperature range of about 700°–1900° K. and preferably between 1000° K. and 1800° K. The upper limits in temperature correspond to the upper limits of gaseous fuel temperature as emitted from a gasifier exit. It is this particular property of the kinetic scheme, that as reaction temperature increases the efficiency of conversion increases, which yields this reaction process readily amenable to directly accept gaseous fuel as the fuel is emitted from the gasifier exit. Consequently, there need not be intermediate temperature control devices between the gasifier apparatus and $NH_3$ conversion site.

Further, the residence time of the reaction should range desirably from about 0.001 to about 10 seconds. As can readily be appreciated, to maintain optimum efficiency of the present inventive process it is required that time be inversely varied with temperature.

The amount of NO is not critical, however, efficiency of the conversion reaction is greatly enhanced if the concentration of NO is at least 50% of the $NH_3$ present. Further, the concentration of NO is most preferably the stoichiometric equal of the $NH_3$ concentration. Although the conversion rate of $NH_3$ to $N_2$ is not affected by the addition of NO in greater than $NH_3$ stoichiometric amounts, the unreacted NO is in itself a toxic contaminant and source of combustion $NO_x$ and therefore, should be avoided.

As can be appreciated by the above discussion, the efficiency of the kinetic process is affected by several parameters, including time, temperature, and concentration of the reactants. In a preferred process the efficiency of the process is determined by a desired $NH_3$ endpoint. In view of the current federal emission standard for $NO_x$ (215 g $NO_x/10^6$ kJ), a preferred embodiment of the present invention contemplates a reduction of $NH_3$ in coal gas to at least about 400 ppm. It has been estimated that 400 ppm of $NH_3$ in the coal gas at present combustion efficiencies, produces 215 g $NO_x/10^6$ kJ of combusted coal gas, see, for example, Folsom, et al., supra. Thus, the required efficiency level of the inventive process will also vary with respect to the amount of contaminating $NH_3$ present in the gaseous fuel. For example, the less $NH_3$ present, the less efficient the system need be to accomplish a residual 400 ppm $NH_3$ endpoint.

Further, as can be acutely appreciated, as the federal emission standards are reduced in the future to the proposed 39 g $NO_x/10^6$ kJ, the efficiency of the system must be dramatically enhanced to accommodate a corresponding residual 100 ppm $NH_3$ endpoint. This result may be accomplished desirably by increasing residence time or increasing reaction temperature.

In accordance with this inventive process, FIG. 3 depicts the ammonia removal capabilities of the proposed process for 4000 ppm NO added to coal gas at 1100° K. and 1250° K. (the approximate temperature range for the Winkler system). By the time the reaction has proceeded for 5 seconds, the ammonia level has decreased to less than 10% of its original value. This indicates that the proposed coal-gas treatment system could decrease fuel-$NO_x$ by at least an order of magnitude for reasonable residence times. It should be noted that the $NH_3$ and NO react to form $N_2$ and $H_2O$. The concentration of the other constituents of coal gas are not significantly affected.

Figure 4:
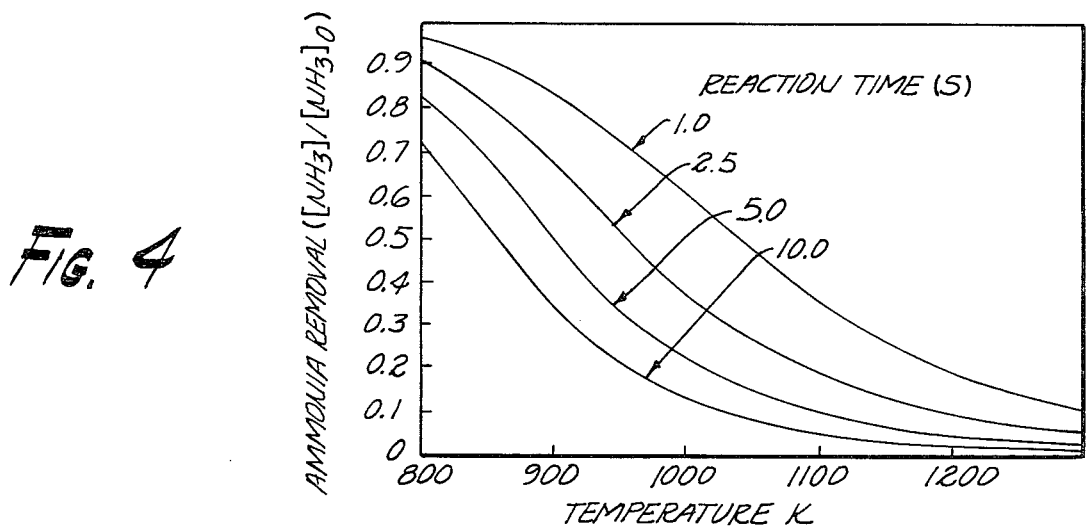
FIG. 4 depicts the effect of reaction temperature on ammonia removal from coal gas for various residence times.

The effect of temperature on ammonia removal from coal gas is shown in FIG. 4. The efficiency of the $NH_3$—NO reactions is pronouncedly affected by the reaction temperature. For example, for a five second reaction time, the $NH_3$ removal efficiency degrades from 98.8% at 1300° K. to 17.3% at 800° K. This indicates that the proposed process may be implemented very close to the gasifier exit to minimize any heat loss and thereby maximize the process efficiency. Alternatively, the process may be implemented at a site leading to the entrance of a combustion chamber. The heat generated from the combustion reaction may be utilized through some sort of heat exchange or conduction means to drive the conversion reaction prior to the gaseous fuel's introduction into the combustion chamber.

Figure 5:
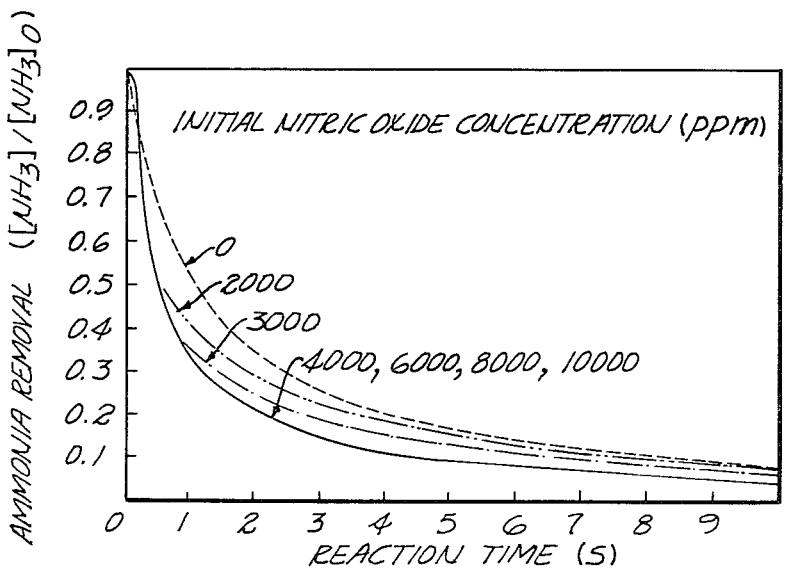
FIG. 5 depicts the effect of nitric oxide concentration on ammonia removal from coal gas as a function of residence times.

The effect of NO reactant concentration is exhibited in FIG. 5. As expected, the efficiency increases with increasing NO concentration up to the point at which the NO and $NH_3$ levels are equal. After this point, the excess NO goes through the system unreacted. Theoretically, to achieve optimum efficiency, it is only necessary to add an amount of NO equivalent to the $NH_3$ level in the coal gas. However, the computer program does not account for finite mixing times or inhomogenities in the system.

It is noteworthy that holding the coal gas at high temperatures for long residence times will result in the relatively efficient conversion of $NH_3$ to $N_2$ without NO injection. No production of NO is predicted for this circumstance. The NO addition process has greatest advantage for shorter residence times, but even at 10 seconds, the unreacted ammonia is aproximately halved with injection of 4000 ppm NO as compared to no NO addition.

Furthermore, the conversion process is not dependent on the availability of oxygen as an initial component. Rather oxygen is generated by several steps along the reaction path. Therefore, the conversion reaction may be carried out efficiently in the presence or absence of exogenous oxygen.

C. Discussion of Results

Fifteen reactions involving carbon containing species were added to the 83 step mechanism after it had been evaluated and verified. This 98 step scheme was then used to model the $NH_3$—NO reactions in coal gas. Winkler Air-Steam low-Btu coal gas was examined in this investigation, but there is no reason to believe that the proposed process cannot be used to convert $NH_3$ to $N_2$ in the products from any gasification process. It was found that the NO addition process could lower the $NH_3$ concentrations in coal gas by one to two orders of magnitude for reasonable residence times. The $NH_3$—NO mechanism is selective and the heating value of the coal gas is not deteriorated. The efficiency of the conversion process is strongly temperature dependent and is increasingly effective at higher temperatures. The effect of the added NO concentration was also analyzed, showing that the effect was most pronounced for short reaction times but that there was also a significant benefit to be obtained for longer residence times.

The processes of this invention, most particularly have utility in reducing production of certain air pollutants connected with coal gas combustion. For example, the coal gasification process generates relatively high concentrations of ammonia. Not only is ammonia toxic and corrosive, in subsequent combustion processes the ammonia is oxidized to forms of $NO_x$. $NO_x$, a major irritant and component of smog, is an extremely poisonous material. Specifically, the present invention effects the conversion of pre-combusted $NH_3$ to $N_2$, a nontoxic and noncorrosive species.

While the methods of this invention have been described in terms of illustrative embodiments, it will be apparent to those of skill in the art that various changes may be made in the methods disclosed without departing from the scope of the invention, which is defined by the following claims.

What is claimed is:

1. A process prior to combustion for selectively converting $NH_3$ to $N_2$ in a nitrogenous contaminated gaseous fuel, said process comprising the steps of:
   providing a volume of pre-combusted gaseous fuel containing $NH_3$;
   contacting said volume of gaseous fuel with NO; and
   reacting said gaseous fuel and NO at a temperature and for a time sufficient to convert a portion of the $NH_3$ to $N_2$.

2. The process according to claim 1 wherein the gaseous fuel is a product of coal gasification.

3. The process according to claim 1 wherein the amount of NO contacting said volume of gaseous fuel ranges from about 0.001 to about 2.5 times the amount of $NH_3$ present in the gaseous fuel.

4. The process according to claim 1 wherein the amount of NO contacting said volume of gaseous fuel is stoichometric with the amount of $NH_3$ in the gaseous fuel.

5. The process according to claim 1 wherein the reaction temperature ranges from about 700° K. to about 1900° K.

6. The process according to claim 1 wherein the reaction is carried out in an oxygen deficient environment.

7. The process according to claim 1 wherein the reaction is carried out in the absence of exogenous $O_2$.

8. The process according to claim 1 wherein the reaction is carried out at a temperature and for a time sufficient to convert a portion of the $NH_3$ to $N_2$ to a predetermined endpoint.

9. The process according to claim 8 wherein the predetermined endpoint is such that the residual nitrogenous components, excluding $N_2$, comprise less than 400 ppm of the gaseous fuel.

10. A process prior to combustion for selectively converting $NH_3$ to $N_2$ in a nitrogenous contaminated gaseous fuel, said process comprising the steps of:
    providing a stream of pre-combusted gaseous fuel containing $NH_3$;
    contacting said gaseous fuel stream with NO; and
    reacting said gaseous fuel stream and NO at a temperature and for a time sufficient to convert a portion of $NH_3$ to $N_2$.

11. The process according to claim 10 wherein the gaseous fuel is a product of coal gasification.

12. The process according to claim 10 wherein the gaseous fuel is provided as an emitted stream from a gasifier exit.

13. The process according to claim 12 wherein the NO contacts the stream of gaseous fuel within a short distance of the gasifier exit, wherein the temperature of the gaseous stream is within about 300° K. of the exit temperature.

14. The process according to claim 12 wherein the temperature of the reaction is maintained by the heat generated by subsequent combustion of the gaseous fuel.

15. The process according to claim 10 wherein the reaction temperature ranges from about 700° K. to about 1900° K.

16. The process according to claim 10 wherein the reaction is carried out in an oxygen deficient environment.

17. The process according to claim 10 wherein the reaction is carried out in the absence of exogenous $O_2$.

18. The process according to claim 10 wherein the amount of NO contacting said stream of gaseous fuel ranges from about 0.001 to about 2.5 times the amount of $NH_3$ present in the gaseous fuel stream.

19. The process according to claim 10 wherein the amount of NO contacting said stream of gaseous fuel is stoichiometric with the amount of $NH_3$ in the gaseous fuel stream.

20. The process according to claim 10 wherein the reaction is carried out at a temperature and for a time sufficient to convert a portion of the $NH_3$ to $N_2$ to a predetermined endpoint.

21. The process according to claim 20 wherein the predetermined endpoint is such that the residual nitrogenous components, excluding $N_2$, comprise less than 400 ppm of the gaseous fuel.

* * * * *